United States Patent
Kitazawa

(10) Patent No.: US 10,599,892 B2
(45) Date of Patent: Mar. 24, 2020

(54) METHOD FOR CONTROL OF CARD READER

(71) Applicant: NIDEC SANKYO CORPORATION, Nagano (JP)

(72) Inventor: Yasuhiro Kitazawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 16/337,915

(22) PCT Filed: Sep. 6, 2017

(86) PCT No.: PCT/JP2017/032147
§ 371 (c)(1),
(2) Date: Mar. 28, 2019

(87) PCT Pub. No.: WO2018/061685
PCT Pub. Date: Apr. 5, 2018

(65) Prior Publication Data
US 2019/0220637 A1 Jul. 18, 2019

(30) Foreign Application Priority Data
Sep. 29, 2016 (JP) .................. 2016-191607

(51) Int. Cl.
*G06K 7/08* (2006.01)
*G06K 7/10* (2006.01)
*G06K 7/00* (2006.01)

(52) U.S. Cl.
CPC ........ *G06K 7/10366* (2013.01); *G06K 7/0013* (2013.01); *G06K 7/087* (2013.01)

(58) Field of Classification Search
CPC ... G06K 19/06046; G06K 7/04; G06K 13/103
(Continued)

(56) References Cited

U.S. PATENT DOCUMENTS 6,021,948 A * 2/2000 Tsai ..................... G06K 7/0004
235/440
8,496,182 B2 * 7/2013 Mizawa ............. G06K 13/0875
235/382
(Continued)

FOREIGN PATENT DOCUMENTS

JP S62102378 5/1987
JP 2010153688 7/2010
(Continued)

OTHER PUBLICATIONS

"International Search Report (Form PCT/ISA/210) of PCT/JP2017/032147," dated Oct. 24, 2017, with English translation thereof, pp. 1-2.

*Primary Examiner* — Daniel St Cyr
(74) *Attorney, Agent, or Firm* — JCIPRNET

(57) ABSTRACT

A method for control of a card reader is provided. A control unit of a card reader performs an IC contact holding step for continuously energizing a solenoid to press an IC contact block against a card, and a holding voltage lowering step in which a state in which the IC contact block is pressed against the card is kept by performing chopper control of repeatedly turning on and off energization to the solenoid. The control unit performs the chopper control with a duty cycle being lowered stepwise. A duty cycle one stage before a duty cycle that is first determined to be a duty cycle in which the IC contact block is not held in a spring contact position (that is, a sensor is turned off) is stored in a storage unit. Thereafter, chopper control is performed by using the duty cycle stored in the storage unit.

12 Claims, 8 Drawing Sheets

(58) Field of Classification Search
USPC .................................. 235/449, 453, 459, 493
See application file for complete search history.

(56) References Cited

U.S. PATENT DOCUMENTS

| | | | |
|---|---|---|---|
| 8,844,817 B2* | 9/2014 | Glanzer | G06K 7/082 |
| | | | 235/449 |
| 8,905,308 B2* | 12/2014 | Orii | G06K 13/08 |
| | | | 235/379 |
| 8,931,698 B2* | 1/2015 | Ishikawa | G07F 19/2055 |
| | | | 235/435 |

FOREIGN PATENT DOCUMENTS

| JP | 2010245282 | 10/2010 |
|---|---|---|
| JP | 2013164675 | 8/2013 |

\* cited by examiner

METHOD FOR CONTROL OF CARD READER

CROSS-REFERENCE TO RELATED APPLICATION

This application is a 371 application of the international PCT application serial no. PCT/JP2017/032147, filed on Sep. 6, 2017, which claims the priority benefits of Japan application no. 2016-191607, filed on Sep. 29, 2016. The entirety of each of the abovementioned patent applications is hereby incorporated by reference herein and made a part of this specification.

TECHNICAL FIELD

The present invention relates to a method for control of a card reader in which an IC contact is in contact with an embedded IC chip of a card to communicate with the card.

BACKGROUND ART

Card readers that scans a magnetic stripe formed on a card with a magnetic head to read or write magnetic data, and communicates data with an IC chip embedded in the card are used. The card reader described in Patent Literature 1 conveys a substantially rectangular card in a transverse direction of the card and takes into the card reader, and scans the card with a magnetic head in a direction orthogonal to a direction in which card is conveyed to read and write magnetic data.

The card reader described in Patent Literature 1 includes an IC contact block that communicates data with an IC chip embedded in a card, a solenoid that moves the IC contact block toward a card conveyance path, and a compressed coil spring that retracts the IC contact block from the card conveyance path. When communicating data with the IC chip, the solenoid is driven to bring the IC contact block into contact with a terminal part provided on a surface of the card.

CITATION LIST

Patent Literature

Patent Literature 1: Japanese Unexamined Patent Application Publication No. 2013-164675

SUMMARY

Technical Problems

In the card reader of Patent Literature 1, when communicating data with the IC chip, the solenoid is continuously energized to keep the IC contact block in contact with the surface of the card. However, if the IC contact block is kept in contact with the surface of the card over a prolonged period of time, when communication is repeatedly performed or the card is left after the communication is finished, energization to the solenoid lasts a prolonged period of time, which can break a coil of the solenoid due to overheating.

To address the issue of overheating when energization lasts over a prolonged period of time, control to lower an effective voltage by repeatedly turning on and off the current (chopper control) is performed instead of keeping a constant current flowing. In performing chopper control, a duty cycle for determining time ratios between time in which the current is on and time in which the current is off is determined. To effectively address the issue of overheating, chopping is desirably performed in a duty cycle as low as possible and in which the IC contact block can be kept in contact with a surface of the card.

In view of the above issue, an object of the present invention is to provide a method for control of a card reader capable of setting a duty cycle to an appropriate value, the duty cycle being used for energization control to inhibit a breakage of a coil of a solenoid that drives an IC contact block.

Solutions to Problems

To solve the problem described above, the present invention is a method for control of a card reader that presses an IC contact block against a card by using a solenoid to communicate with the card, the method including: an IC contact holding step of continuously energizing the solenoid to press the IC contact block against the card; a holding voltage lowering step of performing chopper control to repeatedly turn on and off energization to the solenoid and keeping a state in which the IC contact block is pressed against the card; and a duty cycle setting step of storing a duty cycle used for the chopper control in a storage unit. In the duty cycle setting step, chopper control is performed in a plurality of duty cycles, and whether the IC contact block is held in a contact position in which the IC contact block is capable of being in contact with the card is determined regarding each of the plurality of duty cycles, and a smallest duty cycle in which the IC contact block is held in the contact position, among the plurality of duty cycles, is stored in the storage unit.

In the present invention, the duty cycle used for the chopper control is stored in the storage unit in the duty cycle setting step. In the duty cycle setting step, the smallest duty cycle, among the plurality of duty cycles, in which the IC contact block is held in the contact position is stored in the storage unit. Therefore, since the chopper control can be performed in the holding voltage lowering step, an effective voltage of the solenoid can be lowered. Thus, overheating of the solenoid can be inhibited while keeping the state in which the IC contact block is pressed against the card. Therefore, breakage of the coil of the solenoid can be inhibited.

In the present invention, it is desirable that, in the duty cycle setting step, chopper control is performed with the duty cycle being lowered stepwise, and whether the IC contact block is held in the contact position regarding each step of the duty cycles is determined; and a duty cycle one stage before a duty cycle that is first determined to be a duty cycle in which the IC contact block is not held in the contact position is stored in the storage unit. In this way, the smallest duty cycle in which the IC contact block is held in the contact position can be determined efficiently.

In the present invention, it is desirable that whether a duty cycle is stored in the storage unit is determined at predetermined timing and, if no duty cycle is stored in the storage unit, the duty cycle setting step is performed. For example, the duty cycle setting step is desirably performed when the card reader is activated. Thus, the chopper control is reliably performed. Therefore, overheating of the solenoid can be inhibited and breakage of the coil of the solenoid can be inhibited.

In the present invention, it is desirable that communication with the card is performed via the IC contact block and, after predetermined time elapses since the communication finishes, a process proceeds from the IC contact holding step to the holding voltage lowering step. In this way, when no communication with the card is performed, the effective voltage can be lowered by the chopper control. Therefore, overheating of the solenoid can be inhibited and breakage of the coil of the solenoid can be inhibited.

Effect of the Invention

According to the present invention, a duty cycle used for chopper control is stored in a storage unit in a duty cycle setting step. In the duty cycle setting step, the smallest duty cycle, among the plurality of duty cycles, in which the IC contact block is held in the contact position is stored in the storage unit. Therefore, since the chopper control can be performed in the holding voltage lowering step, an effective voltage of the solenoid can be lowered. Thus, overheating of the solenoid can be inhibited while keeping the state in which the IC contact block is pressed against the card. Therefore, breakage of the coil of the solenoid can be inhibited.

DESCRIPTION OF EMBODIMENTS

Below, embodiments of a method for control of a card reader to which the present invention is applied will be described with reference to the drawings.

(Entire Configuration of Card Reader)

Figure 1:
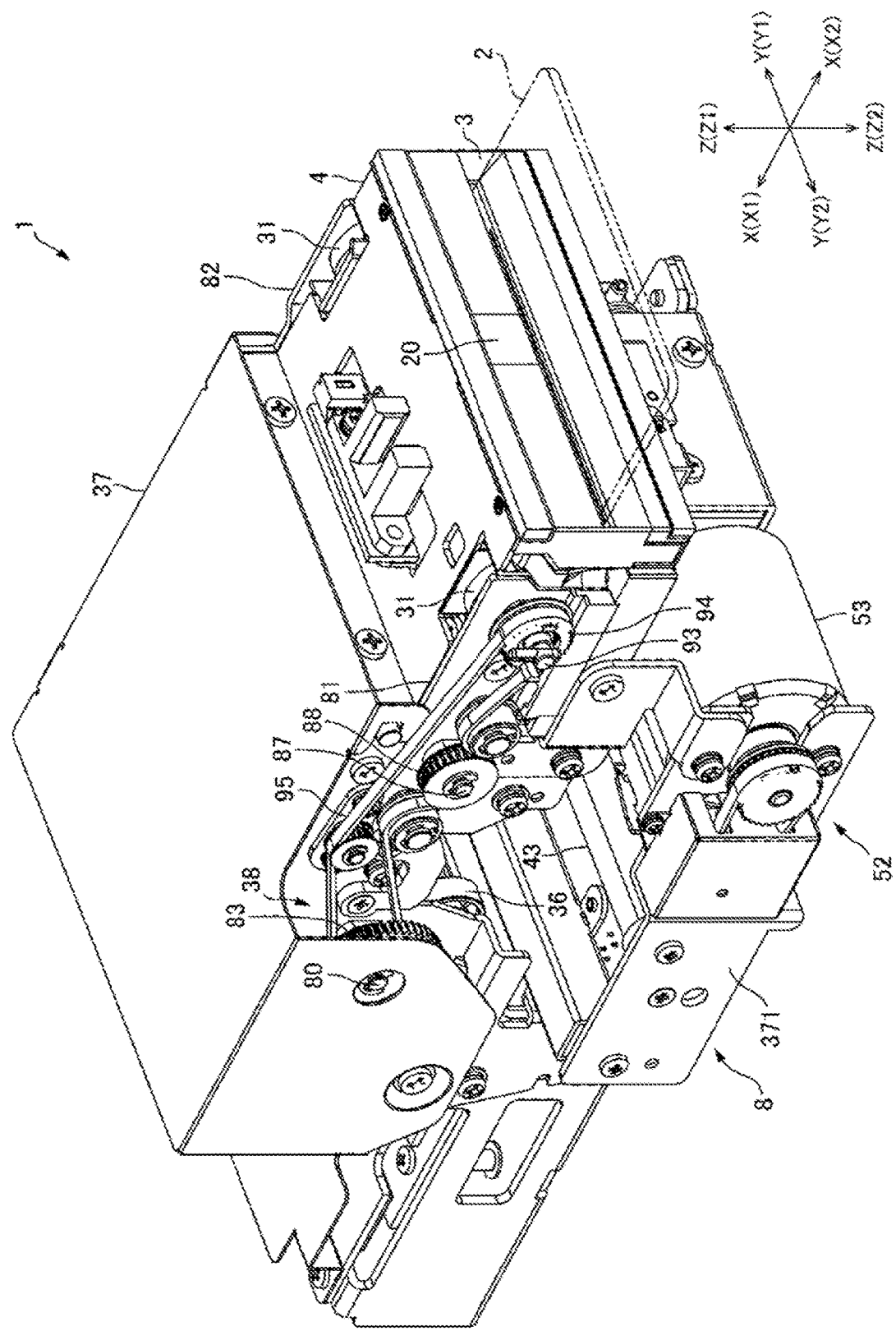
FIG. 1 is a perspective view of a card reader according to an embodiment of the present invention.
Figure 2:
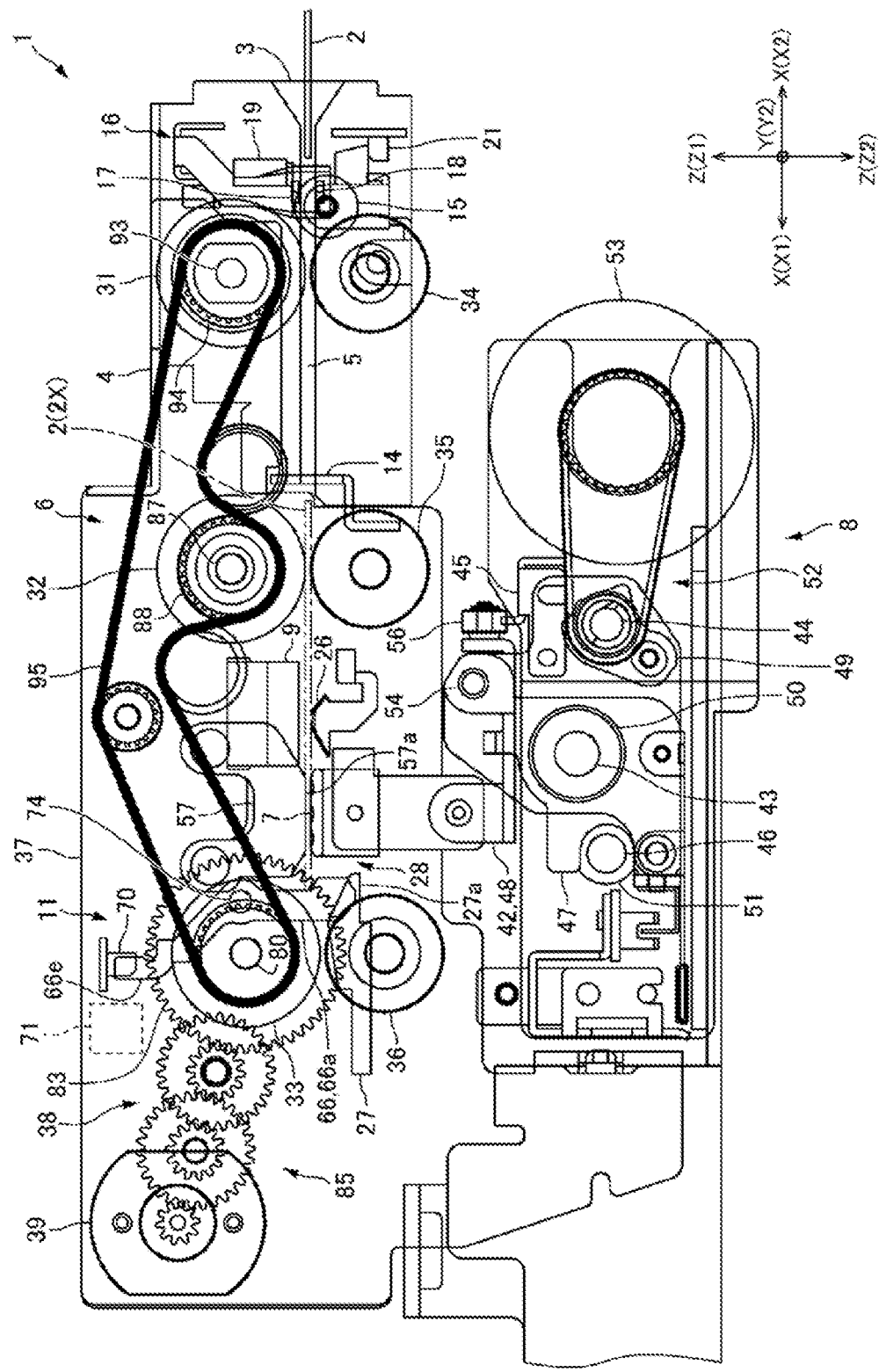
FIG. 2 is an explanatory view illustrating an internal configuration of the card reader illustrated in FIG. 1 when viewed from a side.
Figure 3:
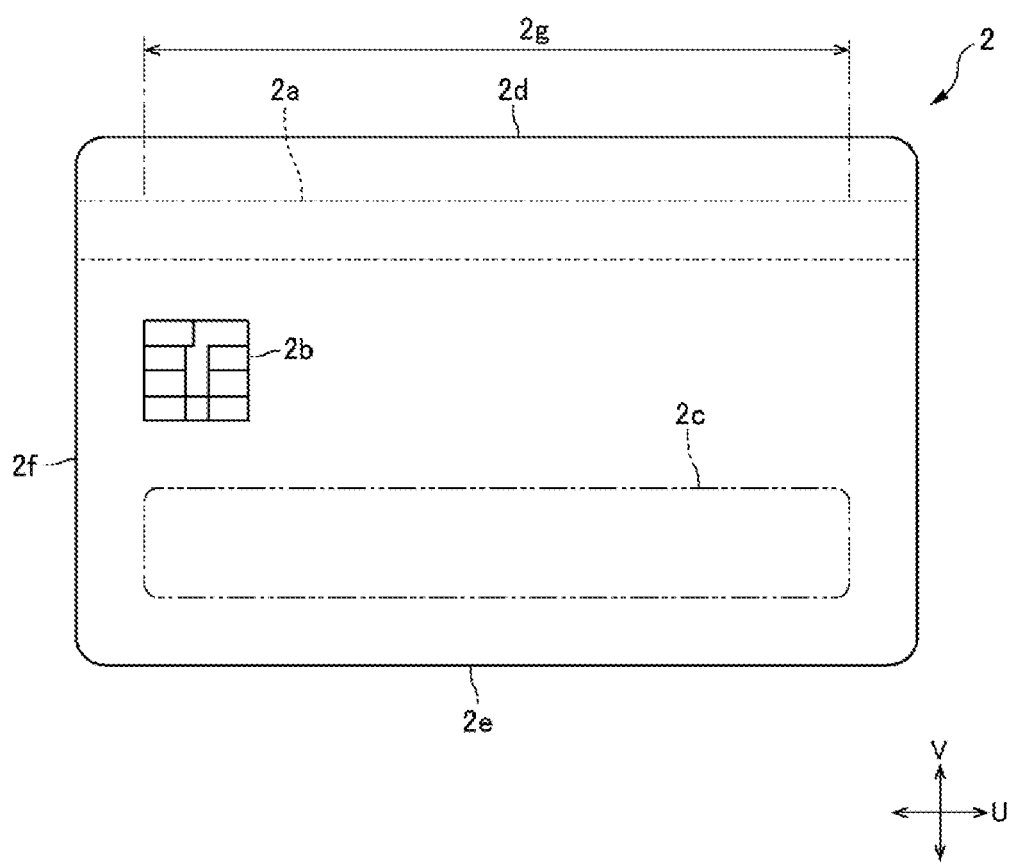
FIG. 3 is a plan view of a card to be processed in the card reader illustrated in FIG. 1.

FIG. 1 is a perspective view of a card reader 1 according to an embodiment of the present invention. FIG. 2 is an explanatory view illustrating an internal configuration of the card reader 1 illustrated in FIG. 1 when viewed from a side. FIG. 3 is a plan view of a card 2 to be processed in the card reader 1 illustrated in FIG. 1.

The card reader 1 is a device that performs at least one of reading of data recorded on the card 2 and writing of data on the card 2. The card reader 1 is used in a predetermined higher-level device, such as an automated teller machine (ATM). The card reader 1 includes a card insertion part 4. An insertion port 3 into which the card 2 is inserted is formed in the card insertion part 4. As illustrated in FIG. 2, a conveyance path 5 along which the card 2 is conveyed is formed inside the card reader 1. The conveyance path 5 is formed connecting to the insertion port 3.

The card reader 1 also includes a card conveyance mechanism 6 that conveys the card 2, a magnetic head 7 that reads magnetic data recorded on the card 2 and writes magnetic data on the card 2 in contact with the card 2, a head moving mechanism 8 that moves the magnetic head 7 in a direction orthogonal to the conveyance direction of the card 2, an IC contact block 9 for communicating data in contact with a later-described terminal part 2b formed in the card 2, a contact block moving mechanism 10 (see FIG. 4A and FIG. 4B) that moves the IC contact block 9, and a positioning mechanism 11 for positioning the card 2 taken into the card reader 1.

The card 2 is made of vinyl chloride and has a thickness of about 0.7 mm to 0.8 mm. The card 2 of the present embodiment has a magnetic stripe and is embossed according to an international standard (for example, ISO/IEC 7811) or a JIS standard (for example, JIS X 6302). The card 2 is substantially rectangular in shape with rounded corners. A magnetic stripe 2a in which magnetic data is recorded is formed on a back surface of the card 2. The card 2 is a contact-type IC card. That is, the card 2 includes an IC chip (not illustrated) embedded therein, and a terminal part 2b formed by eight external connection terminals on a front surface thereof. A part of the card 2 is defined as an embossed area 2c to be embossed. Text, numbers, etc. (embossed portion) formed by embossing in the embossed area 2c protrude on a front surface side of the card 2.

The magnetic stripe 2a is formed in a long thin band shape parallel to the longitudinal direction of the card 2 (U direction in FIG. 3), and is formed in the entire area in the longitudinal direction U of the card 2. The magnetic stripe 2a is formed on a first end 2d side in the transverse direction (V direction in FIG. 3) of the card 2. More specifically, the magnetic stripe 2a is formed in a predetermined range with reference to the first end 2d of the card 2 in the transverse direction V of the card 2 based on an international standard or a JIS standard.

The terminal part 2b is formed at one end side in the longitudinal direction U of the card 2 and at a substantially intermediate position in the transverse direction V of the card 2. The eight external connection terminals forming the terminal part 2b are arranged in four columns in the transverse direction V of the card 2 and two rows in the longitudinal direction of the card 2. In addition, the eight external connection terminals are formed at predetermined positions with reference to the first end 2d of the card 2 in the transverse direction V of the card 2 and one end 2f of the card 2 in the longitudinal direction U based on an international standard or a JIS standard.

In the present embodiment, the card 2 is conveyed in the X direction illustrated in FIG. 1 and other drawings. More specifically, the card 2 is taken in in the X1 direction and ejected in the X2 direction. That is, the X direction is the conveyance direction of the card 2, the X1 direction is the taking-in direction of the card 2, and the X2 direction is the ejecting direction of the card 2. Further, in the present embodiment, the card 2 is taken into the card reader 1 with the transverse direction V of the card 2 matching the X direction. The card 2 is conveyed inside the card reader 1 with the transverse direction V of the card 2 matching the X direction. The card reader 1 conveys the card 2 in the transverse direction V and performs predetermined processing.

The Y direction orthogonal to the X direction matches a width direction of the conveyance path 5, which is the longitudinal direction U of the card 2 taken into the card reader 1 in a correct position. The Z direction orthogonal to the X direction and the Y direction is a height direction of the conveyance path 5 and is a thickness direction of the card 2 taken into the card reader 1. In the present embodiment, the card reader 1 is disposed with the Z direction matching the up-down direction. In the following description, directions and sides are defined as follows: the X direction is "front-rear direction," the Y direction as "left-right direction," and the Z direction is "up-down direction," the X1 direction side is a "back (rear)" side, the X2 direction side is a "front" side, the Y1 direction side is a "right" side, the Y2 direction side is a "left" side, the Z1 direction side is an "upper" side, and the Z2 direction side is a "lower" side.

(Card Insertion Part)

The card insertion part 4 forms a front surface side portion of the card reader 1. The insertion port 3 opens on the front surface of the card insertion part 4 and extends in the left-right direction Y. The card insertion part 4 includes shutter members 14 and 15 disposed on the back side X1 of the insertion port 3, an insertion detection mechanism 16 detecting that the card 2 is inserted in the card reader 1 with the transverse direction V of the card 2 matching the front-rear direction X (that is, that the card 2 is inserted into the insertion port 3), magnetic sensors 17 and 18 detecting that magnetic data is recorded on the card 2, a metal sensor 19 detecting that the external connection terminals of the IC chip are fixed to the card 2 (that is, the terminal part 2b is fixed), and an infrared sensor 20 detecting a motion of a person in front of the card reader 1.

The shutter member 14 is disposed on the back end of the card insertion part 4. The shutter member 15 is disposed on the front side X2 relative to the shutter member 14. When the card 2 inserted from the insertion port 3 comes into contact with the shutter member 15, the shutter member 15 is moved to an open position. The card insertion part 4 also includes a sensor 21 detecting that the shutter member 15 is moved to the open position.

The insertion detection mechanism 16 is disposed at substantially the same position as the shutter member 15 in the front-rear direction X. The insertion detection mechanism 16 includes contact-type sensors each of which is disposed at each of left and right sides of the card insertion part 4. When the card 2 is inserted from the insertion port 3 with the transverse direction of the card 2 matching the front-rear direction X, a detection member of the sensor comes into contact with each of the two sensors. Therefore, based on detection results of the two sensors, it is detected that the card 2 is inserted from the insertion port 3 with the transverse direction V of the card 2 matching the front-rear direction X.

The magnetic sensors 17 and 18 are, for example, fluxgate sensors, and output a signal of a level corresponding to a distance from a magnetic material. The magnetic sensors 17 and 18 are arranged on both sides of the card 2 in the up-down direction Z inserted from the insertion port 3. When a level of a signal output from the magnetic sensor 17 is compared with a level of a signal output from the magnetic sensor 18, it is detected whether the card 2 is inserted from the insertion port 3 with the back surface facing the lower side Z2 or inserted from the insertion port 3 with the front surface facing the lower side Z2.

The metal sensor 19 is a magnetic sensor including an excitation coil, a detection coil, and a core around which the excitation coil and the detection coil are wound. The metal sensor 19 is disposed at a position through which the terminal part 2b of the card 2 inserted in a correct position passes in the left-right direction Y. In the present embodiment, based on detection results of the magnetic sensors 17 and 18 and a detection result of the metal sensor 19, it is detected that the card 2 is inserted from the first end 2d side of the card 2 or from a second end 2e side of the card 2.

The infrared ray sensor 20 is disposed on the front surface side of the card insertion part 4. The infrared sensor 20 is a pyroelectric infrared sensor and includes a pyroelectric element that detects light including infrared rays by a pyroelectric effect. The infrared sensor 20 detects a movement of a human hand or the like in front of the card reader 1. The infrared sensor 20 detects a motion of a person in front of the card reader 1 by detecting, for example, a difference between a temperature of the person in front of the card reader 1 and a temperature around the person within a detection range of the infrared sensor 20 based on the infrared ray generated by the person in front of the card reader 1.

(Conveyance Path and Card Conveyance Mechanism)

The conveyance path 5 is formed in substantially the entire area of the card reader 1 in the front-rear direction X. The card conveyance mechanism 6 includes conveyance rollers 31 to 33 that convey the card 2 in contact with an upper surface of the card 2 and pad rollers 34 to 36 arranged to face the conveyance rollers 31 to 33 from the lower side Z2. The conveyance rollers 31 to 33 are rubber rollers of which surfaces are formed of rubber. The pad rollers 34 to 36 are resin rollers of which surfaces are made of resin. The pad rollers 34 to 36 are urged toward the upper side Z1 and can be in contact with the card 2 from the lower side Z2. Note that the conveyance rollers 31 to 33 may be in contact with the lower surface of the card 2, and the pad rollers 34 to 36 may be arranged to face the conveyance rollers 31 to 33 from the upper side Z1.

The conveyance rollers 31 are disposed inside the card insertion part 4 and are disposed on the front side X2 relative to the shutter member 14. The conveyance rollers 32 and 33 are arranged inside a main body part 37 of the card reader 1. The card reader 1 is disposed on the back side X1 of the card insertion part 4. The conveyance rollers 32 are disposed on the front side X2 relative to the magnetic head 7 and the IC contact block 9 in the front-rear direction X, and are disposed on the back side X1 relative to the shutter member 14. Further, the conveyance rollers 33 are disposed on the back side X1 relative to the magnetic head 7, and are disposed on the back side X1 relative to a contact part 66a of a positioning member 66 which will be described later, that forms the positioning mechanism 11. First one of the conveyance rollers 31 to 33 and the pad rollers 34 to 36 are disposed at a left end of the conveyance path 5 and second one of the conveyance rollers 31 to 33 and the pad rollers 34 to 36 are disposed at a right end of the conveyance path 5. These rollers come in contact with both ends of the card 2 in the longitudinal direction U.

The conveyance rollers 33 are fixed to both ends of a rotating shaft 80 disposed with the left-right direction Y being a shaft direction. The conveyance rollers 32 are held at both ends of a rotating shaft 87 disposed with the left-right direction Y being the shaft direction via an unillustrated torque limiter. Further, the conveyance rollers 31 are fixed to a rotating shaft 93 disposed with the left-right direction Y being a shaft direction. As illustrated in FIG. 1, left end sides of the rotating shafts 80, 87, and 93 are rotatably held by a side plate 81 that forms a part of a left side surface of a frame of the main body part 37 of the card reader 1. Right end sides of the rotating shafts 80, 87, and 93 are rotatably held by a side plate 82 that forms a part of a right side surface of the frame of the main body part 37.

The left end sides of the rotating shafts 80, 87, and 93 protrude to the left side relative to the side plate 81, and a power transmission mechanism 38 formed by a belt, a pulley, a gear train, etc. is assembled to the protruding left end sides of the rotating shafts 80, 87, and 93. That is, a geared pulley 83 is fixed to a left end of the rotating shaft 80. As illustrated in FIG. 2, a motor 39 as a driving source is coupled to a gear of the geared pulley 83 via a gear train 85. A pulley 88 is fixed to a left end of the rotating shaft 87, and a pulley 94 is fixed to a right end side of the rotating shaft 93. A belt 95 is wound round the geared pulley 83 and the pulleys 88 and 94.

Guide members 26 and 27 that guide a lower surface of the card 2 are disposed inside the main body part 37. The guide member 26 is disposed between the conveyance roller 32, the pad roller 35 and the magnetic head 7 in the front-rear direction X, and is disposed on the lower side Z2 of the IC contact block 9. In the front-rear direction X, the guide member 27 is disposed on the back side X1 of the magnetic head 7, and is disposed at substantially the same position as the positioning mechanism 11.

In the present embodiment, each of the two guide members 26 is disposed at each of left and right end sides of the conveyance path 5. The guide member 27 includes two guide parts 27a arranged at predetermined intervals on the left and right. An upper surface of the guide member 26 and an upper surface of the guide part 27a form a part of the lower surface of the conveyance path 5. A space between the guide member 26 and the guide part 27a on the lower surface of the conveyance path 5 is an opening 28. The opening 28 is formed in substantially the entire area of the conveyance path 5 in the left-right direction Y.

(Positioning Mechanism)

The positioning mechanism 11 includes the positioning member 66 in which the contact part 66a with which a back end of the card 2 taken into the card reader 1 comes into contact is formed, a solenoid 71 that drives the positioning member 66 via an unillustrated link member, and the like. The positioning mechanism 11 also includes a sensor 70 that detects a position of the positioning member 66 and a tension coil spring 66b that urges the positioning member 66. The positioning member 66 is rotatably held by a fixing shaft 74 of which shaft direction matches the left-right direction Y. A light shielding portion 66e that shields light in a space between a light emitting element and a light receiving element of the sensor 70 is formed at an upper end of the positioning member 66.

Normally, the positioning mechanism 11 is in a contact position in which a back end of the card 2 can be in contact with the contact part 66a, and in which rotation of the positioning member 66 around the fixing shaft 74 is inhibited. Therefore, when the card 2 is inserted from the insertion port 3 and is conveyed to the back side X1 by the card conveyance mechanism 6, the back end 2d of the card 2 comes into contact with the contact part 66a. Thus, the card 2 is positioned in the front-rear direction X. The positioning mechanism 11 positions the card 2 in a card processing position 2X in which reading and writing of magnetic data are performed by the magnetic head 7 and communication of IC data is performed by the IC contact block 9. When the back end of the card 2 is in contact with the contact part 66a, the light shielding portion 66e shields the light in the space between the light emitting element and the light receiving element of the sensor 70. Two sets of the positioning members 66 and the sensors 70 are provided, each of which pairs is arranged at each of both end sides of the conveyance path 5 in the left-right direction. It is detected that the card 2 is positioned in the card processing position 2X in the front-rear direction X based on detection results of the two sets of sensors 70.

The positioning member 66 is typically positioned in a contact position in which the back end of the card 2 can be in contact with the contact part 66a. When the solenoid 71 is driven, the contact part 66a is rotated in a direction to retract on the upper side Z1 of the conveyance path 5 via an unillustrated link member. When the contact part 66a retracts from the conveyance path 5 to the upper side Z1, the card 2 can pass toward the conveyance rollers 33 and the pad rollers 36.

(Magnetic Head and Head Moving Mechanism)

The head moving mechanism 8 includes a carriage 42 in which the magnetic head 7 is mounted, a guide shaft 43 that guides the carriage 42 in the left-right direction Y, a lead screw 44 that feeds the carriage 42 in the left-right direction Y, a cam plate 45 and a cam roller 56 that move the magnetic head 7 in the up-down direction, and a rotation stopper shaft 46 that inhibits rotation of the carriage 42 around the guide shaft 43. The carriage 42 includes a carriage main body 47 and a head holding member 48 that holds the magnetic head 7. A female screw member 49 that engages with the lead screw 44, a sliding bearing 50 (see FIG. 2) that engages with the guide shaft 43, and a sliding member 51 that engages with the rotation stopper shaft 46 are attached to the carriage main body 47. A motor 53 is coupled to the lead screw 44 via a power transmission mechanism 52 formed by a pulley and a belt.

The head moving mechanism 8 moves the magnetic head 7 from a retracted position in which the magnetic head 7 is retracted from the conveyance path 5 to a head contact position in which the magnetic head 7 can be in contact with the magnetic stripe 2a, and also moves the magnetic head 7 in the left-right direction Y. An opposing member 57 is disposed on the upper side Z1 of the magnetic head 7. The opposing member 57 includes an opposing surface 57a that brings the magnetic head 7 positioned in the head contact position 7B into contact with the card 2 at predetermined contact pressure. Thus, reading and writing of magnetic data with respect to the magnetic stripe 2a by the magnetic head 7 become possible.

(IC Contact Block and Contact Block Moving Mechanism)

Figure 4A:
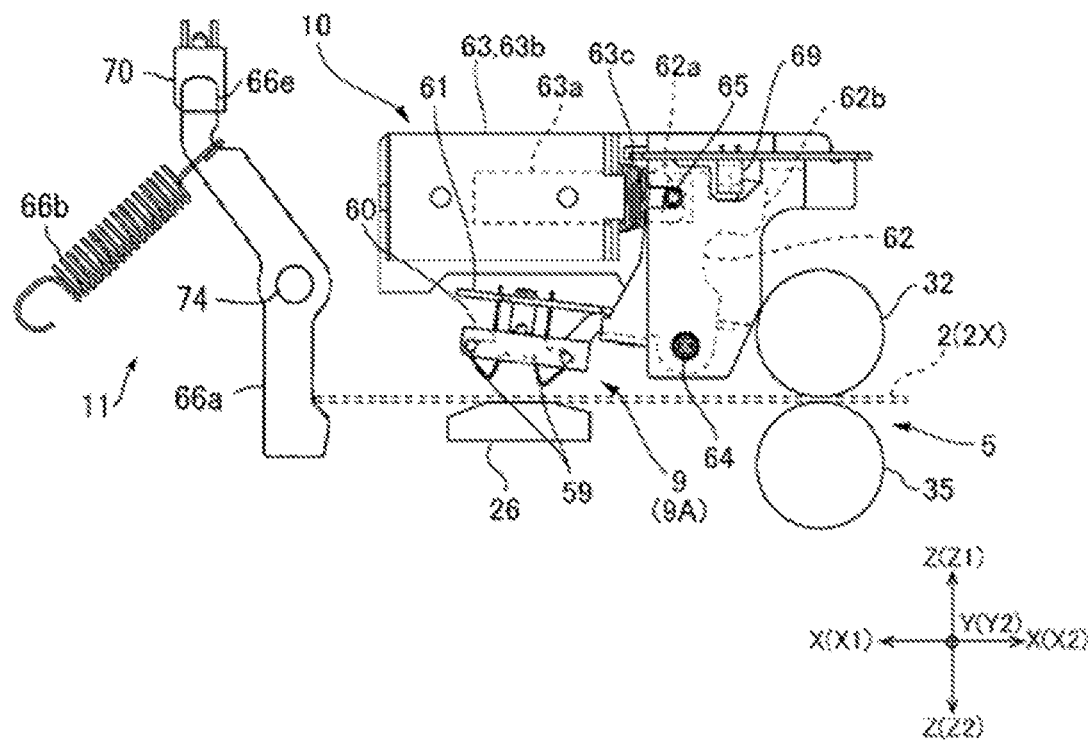
FIG. 4A and FIG. 4B are explanatory views of an operation of an integrated circuit (IC) contact block and a contact block moving mechanism when viewed from a side.
Figure 4B:
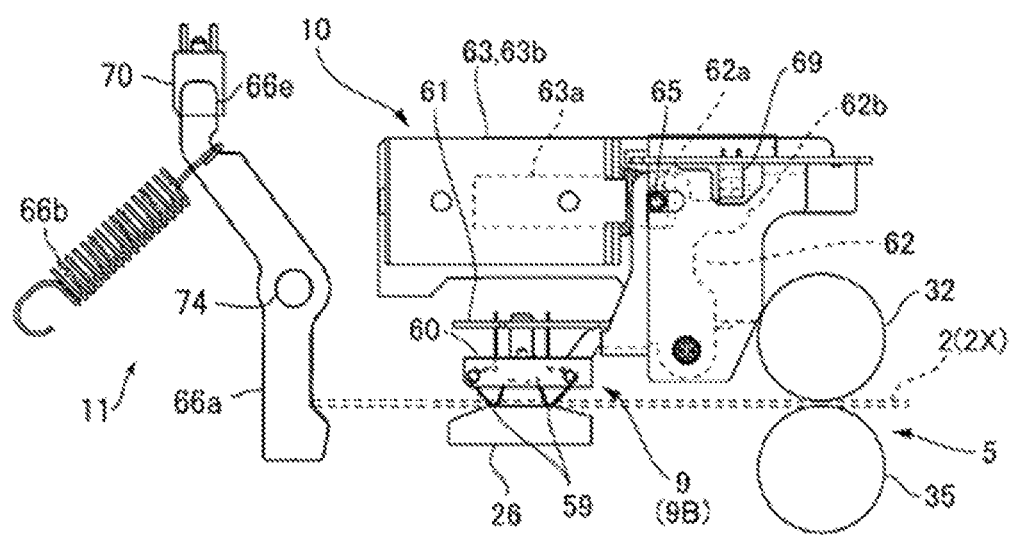

FIG. 4A and FIG. 4B are explanatory views of an operation of the IC contact block 9 and the contact block moving mechanism 10 when viewed from a side. FIG. 4A illustrates a state in which the IC contact block 9 is in a spring retracted position 9A, and FIG. 4B illustrates a state in which the IC contact block 9 is in a spring contact position 9B. The IC contact block 9 includes a plurality of IC contact springs 59 each of which is in contact with each of the external connection terminals that form the terminal part 2b (see FIG. 3) of the card 2, a spring holding member 60 that holds the IC contact spring 59, and a circuit board 61 to which the IC contact spring 59 is coupled. The circuit board 61 is fixed to the spring holding member 60. The IC contact block 9 is disposed on the upper side Z1 of the conveyance path 5. Further, as illustrated in FIG. 2, the IC contact block 9 is disposed between the conveyance rollers 32, the pad rollers 35 and the magnetic head 7 in the front-rear direction X. The IC contact block 9 is disposed on the left end side of the conveyance path 5 in the left-right direction Y. On the lower side Z2 of the IC contact block 9, the guide member 26 disposed on the left end side of the two guide members 26 is disposed.

As illustrated in FIG. 4A and FIG. 4B, the contact block moving mechanism 10 includes a block holding member 62 to which the IC contact block 9 is fixed, and a solenoid 63. The block holding member 62 is rotatably held by a fixing shaft 64 that is fixed to the frame of the main body part 37 with the left-right direction Y being the shaft direction. A fixing pin 65 is fixed to a plunger 63a of the solenoid 63. The fixing pin 65 engages with an engaging groove 62a formed in the block holding member 62. The solenoid 63 is disposed such that the plunger 63a is moved in the front-rear direction X. A compressed coil spring 63c is disposed between a main body 63b of the solenoid 63 and the plunger 63a.

When the plunger 63a protrudes from the main body 63b with the urging force of the compressed coil spring 63c, the IC contact block 9 is retracted to the spring retracted position 9A on the upper side Z1 of the conveyance path 5 as illustrated in FIG. 4A. In this state, when the solenoid 63 is driven, the plunger 63a is retracted toward the main body 63b against the urging force of the compressed coil spring 63c. Then, the block holding member 62 is rotated and the IC contact block 9 is lowered. Therefore, the IC contact block 9 is moved to the spring contact position 9B in which the IC contact spring 59 can be in contact with the external connection terminal. When the IC contact block 9 is lowered to the spring contact position 9B, the IC contact spring 59 can be in contact with the external connection terminals that form the terminal part 2b of the card 2. That is, when the card 2 is taken into the conveyance path 5 and positioned in the card processing position 2X, the IC contact spring 59 comes into contact with the external connection terminals of the card 2. When the card 2 is not taken into the conveyance path 5, the IC contact spring 59 comes into contact with the guide member 26. The contact block moving mechanism 10 moves the IC contact block 9 between the spring contact position 9B in which the IC contact spring 59 can be in contact with the external connection terminals of the card 2 and the spring retracted position 9A in which the IC contact spring 59 is retracted from the conveyance path 5.

The contact block moving mechanism 10 also includes a sensor 69 that can detect a to-be-detected piece 62b provided at an upper end of the block holding member 62. The sensor 69 is an optical sensor including a light emitting element and a light receiving element. When the IC contact block 9 is retracted to the spring retracted position 9A, the to-be-detected piece 62b is positioned at a position out of a space between the light emitting element and the light receiving element of the sensor 69. When the IC contact block 9 is positioned in the spring contact position 9B, the to-be-detected piece 62b is positioned in a position shielding the light of the light emitting element of the sensor 69. Based on a detection result of the sensor 69, it is detected that the IC contact block 9 is moved to the spring contact position 9B.

(Schematic Operation of Card Reader)

In the card reader 1 configured as described above, the shutter member 14 is positioned in a closed position and closes the conveyance path 5 during standby before the card 2 is inserted from the insertion port 3. In this standby state, the magnetic head 7 is positioned in the head retracted position retracted from the conveyance path 5, and the IC contact block 9 is positioned in the spring retracted position 9A retracted from the conveyance path 5. Further, in this standby state, the contact part 66a of the positioning mechanism 11 is positioned in a position in which the contact part 66a can be into contact with the card 2 conveyed along the conveyance path 5.

The shutter member 14 disposed on the back side of the card insertion part 4 is moved to an open position when it is detected that a proper card 2 is inserted from the insertion port 3 in a correct position. That is, it is detected based on a detection result of the sensor 21 that the card 2 is inserted from the insertion port 3, it is detected based on a detection result of the insertion detection mechanism 16 that the card 2 is inserted from the insertion port 3 such that the transverse direction V of the card 2 matches the front-rear direction X, and it is detected based on detection results of the magnetic sensors 17 and 18 and the metal sensor 19 that the card 2 provided with the terminal part 2b and having the magnetic data recorded therein is inserted from the first end 2d side of the card 2 with the back surface facing the lower side Z2, then the shutter member 14 is moved to the open position.

Further, when it is detected that a proper card 2 is inserted from the insertion port 3 in a correct position, the motor 39 is activated and the card conveyance mechanism 6 conveys the card 2 to the back side X1. When the first end 2d of the card 2 comes into contact with the contact part 66a of the positioning member 66 and the light going from the light emitting elements of the two sensors 70 to the light receiving elements is shielded by the light shielding portion 66e, it is detected that the card 2 is positioned in the card processing position 2X in the front-rear direction X. Then, the motor 39 is stopped. Further, in the card processing position 2X, since the card 2 is taken into the back side of the shutter member 14, the shutter member 14 is moved to the closed position and closes the conveyance path 5.

Thereafter, the head moving mechanism 8 and the magnetic head 7 are activated, and the magnetic head 7 is moved from the head retracted position to the head contact position in which the magnetic head 7 can be in contact with the magnetic stripe 2a. Then, the magnetic head 7 is moved in the left-right direction Y while being in contact with the magnetic stripe 2a of the card 2 to read and write the magnetic data. Further, the solenoid 63 is activated to lower the IC contact block 9 and bring the IC contact spring 59 into contact with the external connection terminals that form the terminal part 2b of the card 2 whereby communication of data with the card 2 is performed. During reading and writing of magnetic data by the magnetic head 7 and during communication of data via the IC contact block 9, the card 2 is held between the conveyance rollers 32 and the pad rollers 35 with the first end 2d thereof pressed against the contact part 66a.

(Control System)

Figure 5:
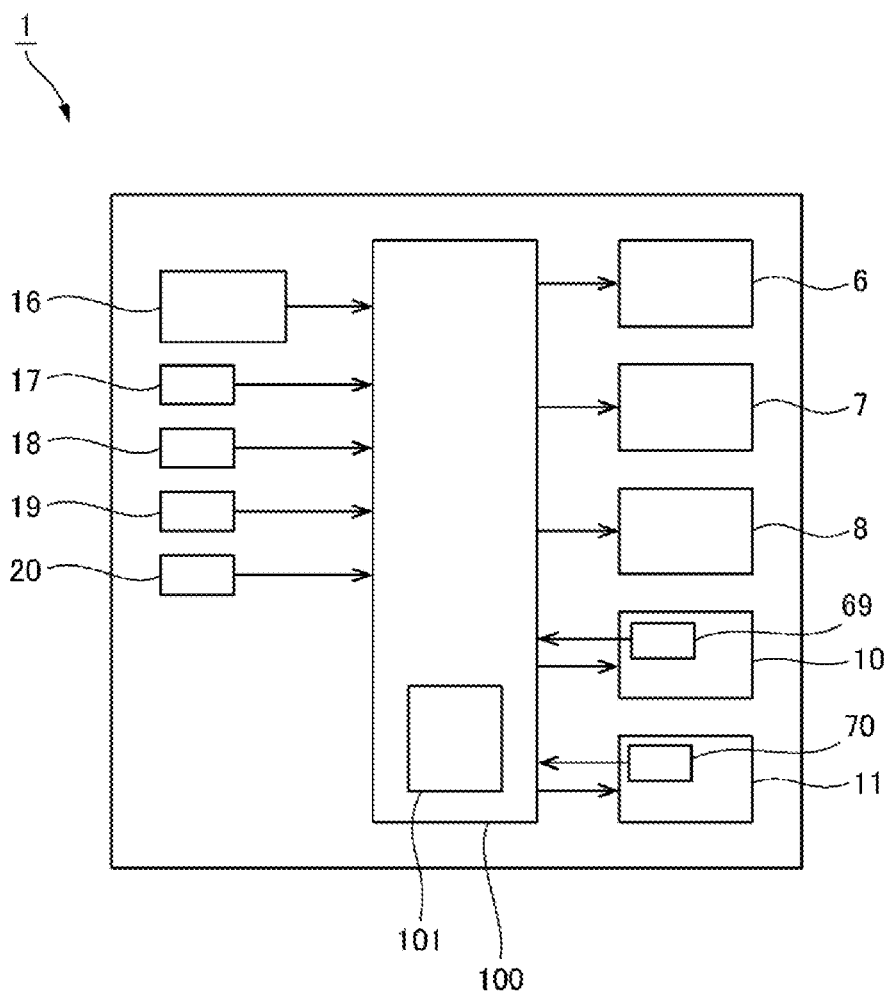
FIG. 5 is a schematic block diagram illustrating a control system of the card reader.

FIG. 5 is a schematic block diagram illustrating a control system of the card reader 1. The card reader 1 includes a control unit 100 that controls, for example, the card conveyance mechanism 6, the magnetic head 7, the head moving mechanism 8, the contact block moving mechanism 10, and the positioning mechanism 11. The control unit 100 includes a storage unit 101 that stores a control program and various types of data. Detection signals of sensors provided in the card insertion part 4 (e.g., a sensor of the insertion detection mechanism 16, the magnetic sensors 17 and 18, the metal sensor 19, and the infrared sensor 20) are input in the control unit 100. A detection signal of the sensor 70 of the positioning mechanism 11 and a detection signal of the sensor 69 of the contact block moving mechanism 10 are input in the control unit 100.

(Details of Operation of IC Contact Block)

Figure 6:
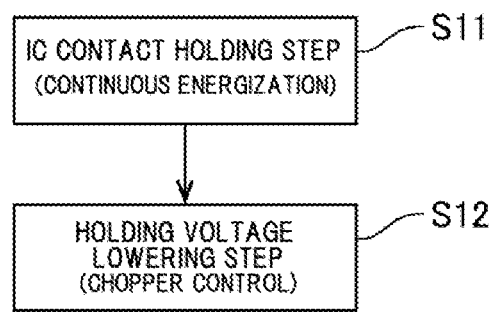
FIG. 6 is a flowchart illustrating control of the contact block moving mechanism.
Figure 7:
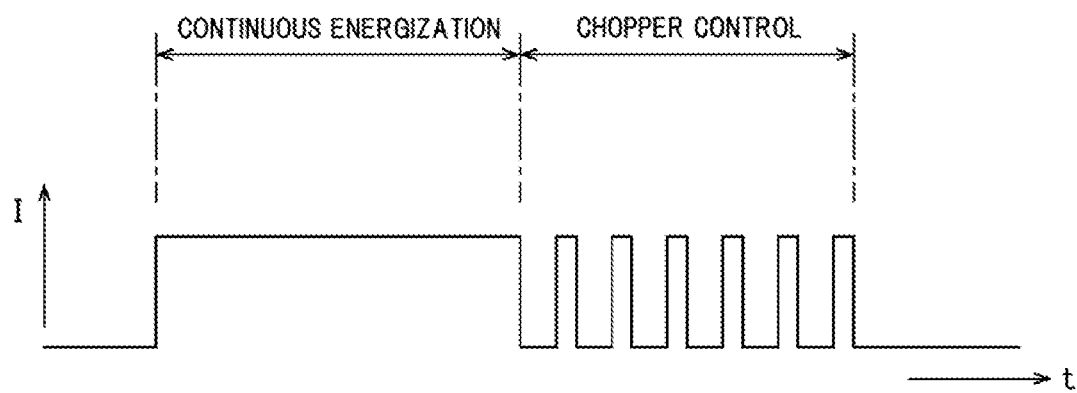
FIG. 7 is an explanatory view illustrating an energization pattern to a solenoid when the IC contact block is held at a spring contact position.

In order to perform communication of data with the IC chip mounted in the card 2, the control unit 100 of the card reader 1 controls the contact block moving mechanism 10 to hold the IC contact block 9 in the spring contact position 9B. FIG. 6 is a flowchart illustrating control of the contact block moving mechanism 10, and FIG. 7 is an explanatory view illustrating an energization pattern to the solenoid 63 when the IC contact block 9 is held in the spring contact position 9B.

When the card 2 is taken in from the insertion port 3 and set in the card processing position 2X, the control unit 100 of the card reader 1 performs processing of steps S11 to S12 illustrated in FIG. 6. In step S11 (IC contact holding step), a constant current is continuously supplied to the solenoid 63 to move the IC contact block 9 to the spring contact position 9B. The IC contact block 9 is then pressed against the card 2 and held in the spring contact position 9B. When communication of data is performed with the IC chip mounted in the card 2, the control unit 100 continuously to energizes the solenoid 63. Then, when predetermined time (for example, about several seconds) elapses after the communication of data finished, the process proceeds to step S12.

In step S12 (holding voltage lowering step), chopper control of repeatedly turning on and off energization to the solenoid 63 is performed. The chopper control can lower an effective voltage. Therefore, overheating can be inhibited. In step S12, time to turn on and time to turn off the energization are controlled based on the duty cycle stored in the storage unit 101. A duty cycle value whereat a state in which the IC contact block 9 is pressed against the card 2 can be kept is stored previously in the storage unit 101.

Figure 8:
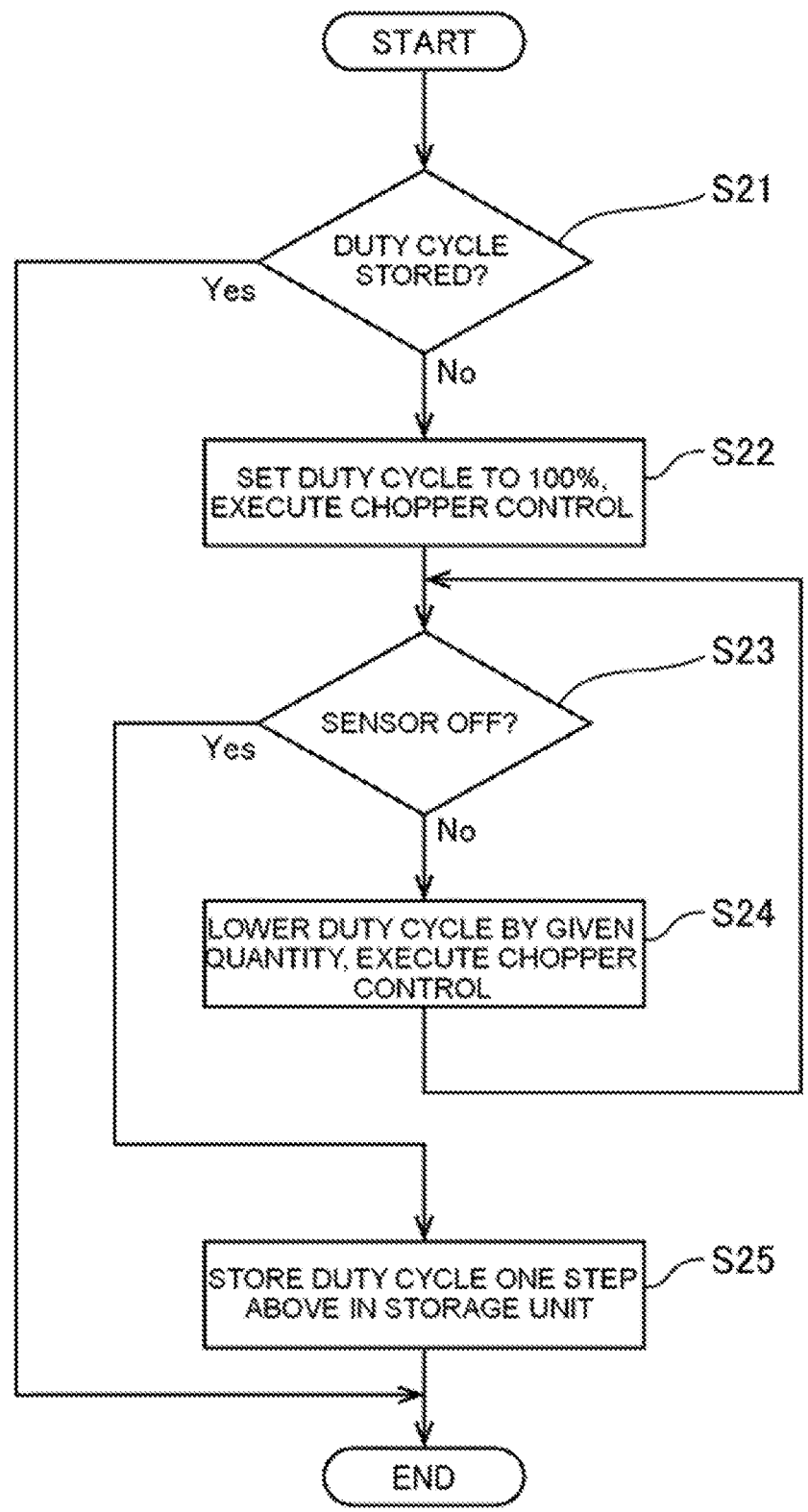
FIG. 8 is a flowchart of control for setting a duty cycle used for chopper control.

FIG. 8 is a flowchart of control for setting a duty cycle used for the chopper control. The control unit 100 performs the processing of steps S21 to S25 (duty cycle learning step), determines a duty cycle value whereat a state in which the IC contact block 9 is pressed against the card 2 can be kept, and stores the determined duty cycle value in the storage unit 101.

The control unit 100 performs the processing of steps S21 to S25 (duty cycle learning step) at predetermined timing. For example, the processing of steps S21 to S25 is performed when the card reader 1 is activated. In this case, the processing of steps S21 to S25 is performed with the card 2 not being inserted in the card reader 1. First, in step S21, whether the duty cycle is stored in the storage unit 101 is determined. When the duty cycle is stored in the storage unit 101 (step S21: Yes), the process is finished. When the duty cycle is not stored in the storage unit 101 (step S21: No), the process proceeds to step S22.

In the duty cycle learning step, the control unit 100 performs processing for determining the duty cycle in which the IC contact block 9 can be in contact with the card 2. That is, the solenoid 63 of the contact block moving mechanism 10 is energized and chopper control is performed in a plurality of duty cycles. Then, regarding each of the plurality of duty cycles, whether a detection signal of the sensor 69 of the contact block moving mechanism 10 is on or off is determined. When output of the sensor 69 is on, the IC contact block 9 does not come into contact with the card 2 as illustrated in FIG. 4A. When output of the sensor 69 is off, the IC contact block 9 can be in contact with the card 2 as illustrated in FIG. 4B. That is, based on the detection signal of the sensor 69, whether the IC contact block 9 can be into contact with the card 2 at each of the plurality of duty cycles can be determined.

Figure 9:
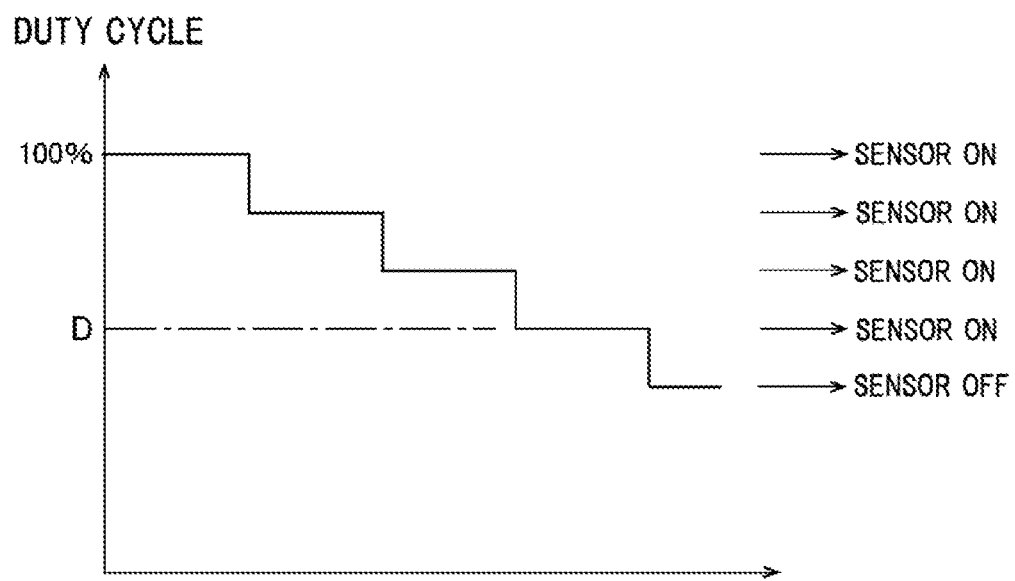
FIG. 9 is an explanatory view illustrating a method for determining a duty cycle.

More specifically, the control unit 100 performs processing of steps S22 to S24. FIG. 9 is an explanatory view illustrating a method for determining a duty cycle. In the present embodiment, as illustrated in FIG. 9, the duty cycle is lowered stepwise from 100%. First, in step S22, the duty cycle is set to an upper limit (100%) and the chopper control is performed for predetermined time. Then, in step S23, whether the detection signal of the sensor 69 is turned off in the predetermined time is determined. If the detection signal of the sensor 69 is not turned off (step S23: No), the process proceeds to step S24, in which the chopper control is performed for predetermined time with a duty cycle one stage below. Then, the process returns to step S23 and whether the detection signal of the sensor 69 is turned off in the predetermined time is determined. When it is detected that the detection signal of the sensor 69 is turned off (step S23: Yes), the process proceeds to step S25. In step 25, a duty cycle D one stage above a first duty cycle in which the detection signal of the sensor 69 is switched from on to off is stored in the storage unit 101.

As described above, by the processing of steps S22 to S25, a smallest duty cycle D in which the IC contact block 9 can be in contact with the card 2 is determined from among the plurality of duty cycles and is stored in the storage unit 101.

(Main Effects of Present Embodiment)

As described above, when pressing the IC contact block 9 against the card 2 using the solenoid 63 to communicate data with the card 2, the contact block moving mechanism 10 of the present embodiment performs the IC contact holding step S11 for continuously energizing the solenoid 63 to press the IC contact block 9 against the card 2, the holding voltage lowering step S12 for performing the chopper control of repeatedly turning on and off energization to the solenoid 63 to keep the state in which the IC contact block 9 is pressed against the card 2, and the duty cycle setting step (steps S21 to S25) for storing the duty cycle D used for the chopper control in the storage unit 101. In the duty cycle setting step, an optimum duty cycle is learned based on a dedicated command. The optimum duty cycle is, among the plurality of duty cycles, the smallest duty cycle D in which the IC contact block 9 is held in the spring contact position 9B. Therefore, since the effective voltage of the solenoid 63 can be lowered by performing the chopper control, overheating of the solenoid 63 can be inhibited while keeping the state in which the IC contact block 9 is pressed against the card 2. Therefore, breakage of the coil of the solenoid 63 can be inhibited.

In the present embodiment, in the duty cycle setting step (steps S21 to S25), the chopper control is performed with the duty cycle being lowered stepwise, and whether the IC contact block 9 is held in the spring contact position 9B regarding the duty cycle of each step is determined based on the detection result of the sensor 69. Then, the duty cycle D one stage before a duty cycle that is first determined to be a duty cycle in which the IC contact block 9 is not held in the spring contact position 9B (that is, the sensor 69 is turned off) is stored in the storage unit 101. By this method, the smallest duty cycle D in which the IC contact block 9 is held in the contact position can be efficiently determined.

In the present embodiment, whether a duty cycle is stored in the storage unit 101 is determined at predetermined timing (e.g., when the card reader 1 is activated). If no duty cycle is stored in the storage unit 101, a duty cycle is set. If a duty cycle is set in an initialization operation during activation of the card reader 1, the chopper control can be reliably performed. Therefore, overheating of the solenoid 63 can be inhibited, and breakage of the coil of the solenoid 63 can be inhibited.

In the present embodiment, after predetermined time elapses since communication of data with the card 2 is finished (e.g., several seconds after communication of data is finished), the process proceeds from the IC contact holding step S11 to the holding voltage lowering step S12. Therefore, since the solenoid 63 is not left energized over a prolonged period of time without communicating data with the IC chip, overheating of the solenoid 63 can be inhibited by the chopper control. Therefore, breakage of the coil of the solenoid 63 can be inhibited.

Other Embodiments

The embodiment described above is one example of a preferred embodiment of the present invention, but the invention is not limited to this. Various modified embodiments are possible without departing from the spirit and scope of the present invention.

(1) In the embodiment described above, the duty cycle is lowered stepwise in the duty cycle setting step, and a duty cycle one stage before a duty cycle that is first determined to be a duty cycle in which the IC contact block 9 is not held in the spring contact position 9B is stored in the storage unit 101. However, the duty cycle may be controlled to increase stepwise, and the duty cycle that is determined first that the IC contact block 9 is held in the spring contact position 9B (that is, the sensor 69 is turned on) may be controlled to be stored in the storage unit 101.

(2) In the embodiment described above, a method in which the duty cycle is set with the card 2 not inserted, and whether the IC contact block 9 is positioned in the spring contact position 9B based on the detection signal of the sensor 69 is determined is used. However, a method in which a card for setting is inserted and whether the IC contact block 9 is positioned in the spring contact position 9B based on whether communication of data can be performed with the card for setting is determined may be employed.

(3) In the embodiment described above, the IC contact block moving mechanism 10 is applied to a card reader that conveys the card 2 in the transverse direction and takes into the card reader for processing, but the IC contact block moving mechanism 10 may be applied to a card reader that conveys the card 2 in the longitudinal direction of the card. In this case, a position of the card 2 is monitored by a card position sensor in the conveyance path, the card 2 is positioned in the card processing position by the card conveyance mechanism that is controlled based on a signal of the card position sensor, and the IC contact spring 59 is in contact with the external connection terminals of the card 2.

The invention claimed is:

1. A method for control of a card reader that presses an IC contact block against a card by using a solenoid to communicate with the card, the method comprising:
    an IC contact holding step of continuously energizing the solenoid to press the IC contact block against the card;
    a holding voltage lowering step of performing a chopper control to repeatedly turn on and off energization to the solenoid and keeping a state in which the IC contact block is pressed against the card; and
    a duty cycle setting step of storing a duty cycle used for the chopper control in a storage unit, wherein,
    in the duty cycle setting step,
        the chopper control is performed in a plurality of duty cycles, and whether the IC contact block is held in a contact position in which the IC contact block is capable of being in contact with the card is determined regarding each of the plurality of duty cycles, and
        a smallest duty cycle in which the IC contact block is held in the contact position, among the plurality of duty cycles, is stored in the storage unit.

2. The method for control of a card reader according to claim 1, wherein in the duty cycle setting step,
    the chopper control is performed with the duty cycle being lowered stepwise, and whether the IC contact block is held in the contact position regarding each step of the duty cycles is determined; and
    a duty cycle one stage before a duty cycle that is first determined to be a duty cycle in which the IC contact block is not held in the contact position is stored in the storage unit.

3. The method for control of a card reader according to claim 2, wherein
    whether a duty cycle is stored in the storage unit is determined at a predetermined timing; and
    when no duty cycle is stored in the storage unit, the duty cycle setting step is performed.

4. The method for control of a card reader according to claim 3, wherein the predetermined timing is when the card reader is activated.

5. The method for control of a card reader according to claim 4, wherein
    a communication with the card is performed via the IC contact block, and after a predetermined time elapses since the communication finishes, a process proceeds from the IC contact holding step to the holding voltage lowering step.

6. The method for control of a card reader according to claim 2, wherein
    a communication with the card is performed via the IC contact block, and after a predetermined time elapses since the communication finishes, a process proceeds from the IC contact holding step to the holding voltage lowering step.

7. The method for control of a card reader according to claim 3, wherein
    a communication with the card is performed via the IC contact block, and after a predetermined time elapses since the communication finishes, a process proceeds from the IC contact holding step to the holding voltage lowering step.

8. The method for control of a card reader according to claim 1, wherein
    whether a duty cycle is stored in the storage unit is determined at a predetermined timing; and
    when no duty cycle is stored in the storage unit, the duty cycle setting step is performed.

9. The method for control of a card reader according to claim 8, wherein
    the predetermined timing is when the card reader is activated.

10. The method for control of a card reader according to claim 9, wherein
    a communication with the card is performed via the IC contact block, and after a predetermined time elapses since the communication finishes, a process proceeds from the IC contact holding step to the holding voltage lowering step.

11. The method for control of a card reader according to claim 8, wherein a communication with the card is performed via the IC contact block, and after a predetermined time elapses since the communication finishes, a process proceeds from the IC contact holding step to the holding voltage lowering step.

12. The method for control of a card reader according to claim 1, wherein a communication with the card is performed via the IC contact block, and after a predetermined time elapses since the communication finishes, a process proceeds from the IC contact holding step to the holding voltage lowering step.

* * * * *